2,917,390
PREPARATION OF STABLE POLYOL SOLUTIONS AND THE RESULTING PRODUCT

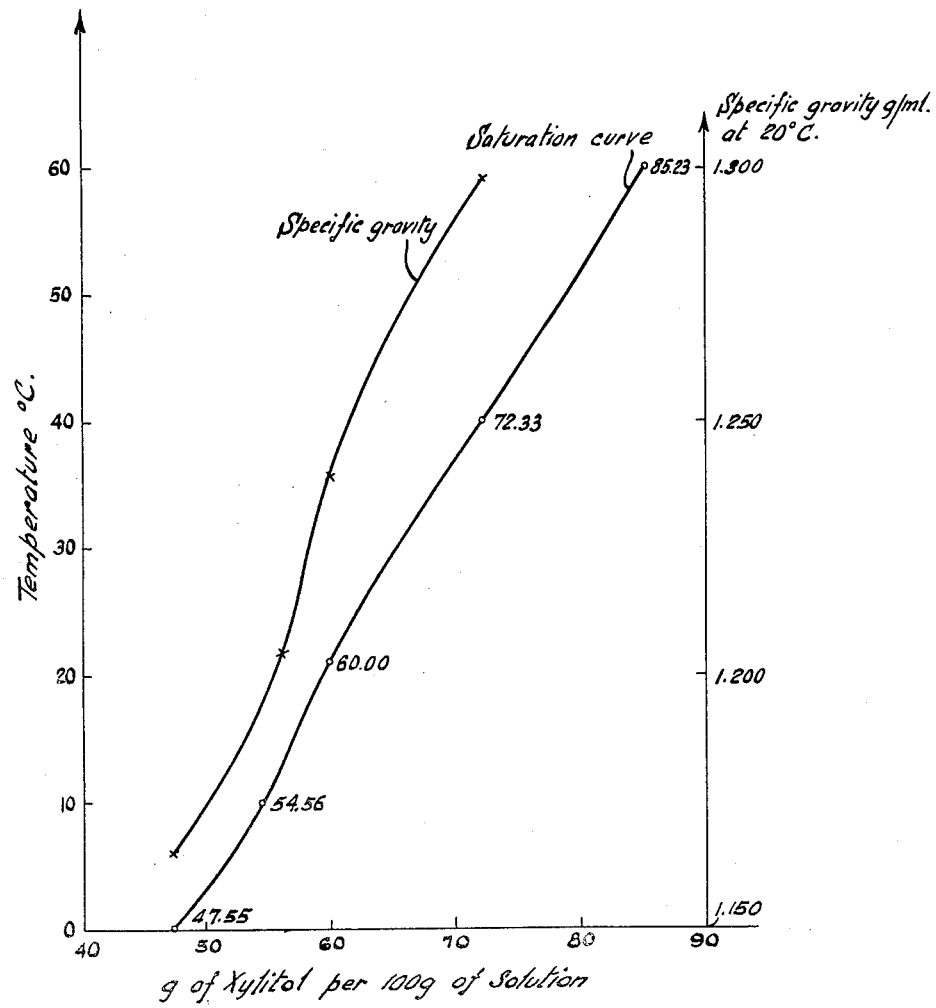

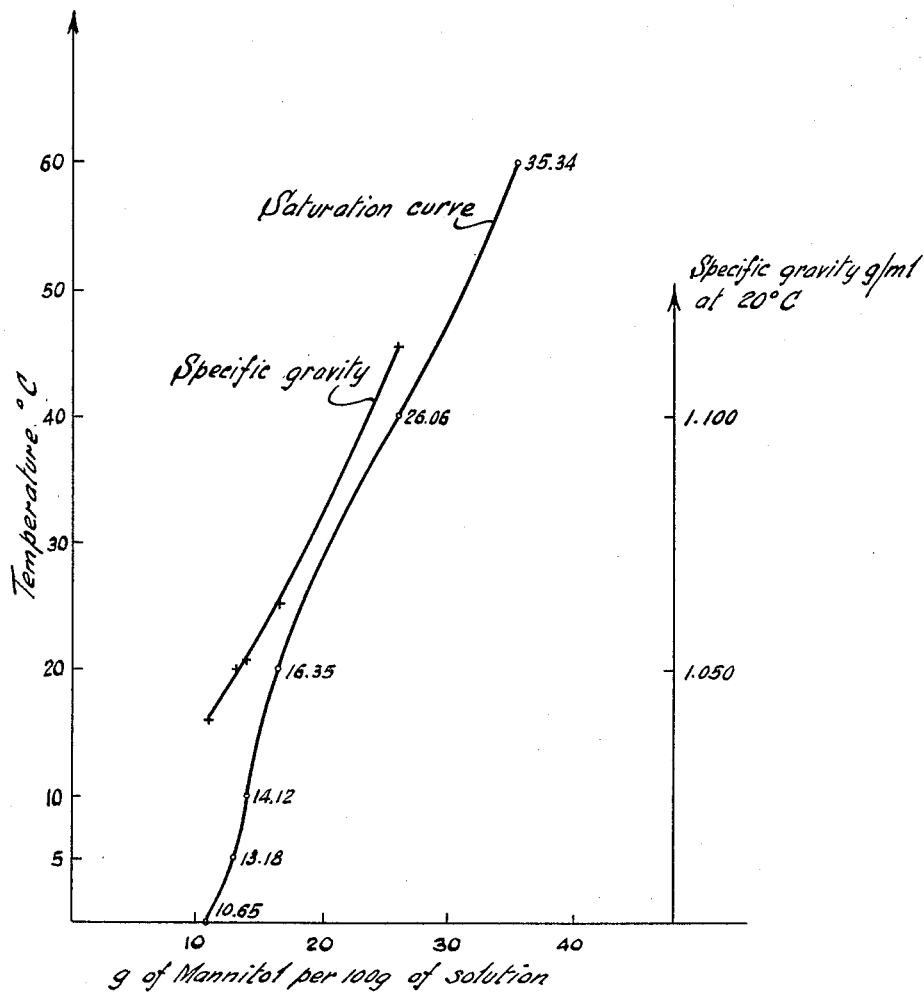

Alfons Apel, Mannheim-Rheinau, and Georg Rössler, Mannheim-Kafertal, Germany, assignors to Udic Société Anonyme, Vevey, Switzerland Application December 12, 1957, Serial No. 702,401

Claims priority, application Switzerland December 12, 1956

7 Claims. (Cl. 99—142)

The invention relates to the preparation of stable concentrated aqueous polyol solutions from the mother liquors obtained as by-product in the saccharification of cellulosic materials.

Particularly suitable are the mother liquors obtained in the Bergius-Rheinau process. Said process is preferably carried out in such a way that finely comminuted cellulosic material, for instance sawdust, is first treated in a so-called prehydrolysis step at a temperature of about 15 to 30° C. with hydrochloric acid of about 29 to 37% concentration, whereby the concentration depends on the nature of the starting material. In this prehydrolysis step, the hemicelluloses and pentoses are dissolved. The obtained solution is freed from the hydrochloric acid, and if the starting material was rich in pentoses, xylose may be recovered from said solution in crystalline form.

The solid residue from the prehydrolysis step is then subjected at the ambient temperature of about 15–30° C. to the main hydrolysis with strong hydrochloric acid of 39–42% HCl, and this acidic solution is then worked up to a sugar solution from which the major part of the glucose content is recovered by crystallization.

The mother liquors from the glucose crystallization (main hydrolysis) and from the xylose crystallization (prehydrolysis), or the entire de-acidified and purified prehydrolysis liquor itself, comprise mixtures of pentoses and hexoses which cannot be separated by crystallization, even when they are obtained relatively free of decomposition and polymerization products, by the gentle two-step low temperature hydrolysis with hydrochloric acid according to the Bergius-Rheinau process. These by-products of the wood saccharification are, therefore, of little economic value.

An economic separation and utilization of the by-product sugars of the wood saccharification is, however, possible by hydrogenation of the residual sugar syrups to polyols and by separation of said polyols.

The hydrogenation is preferably carried out in aqueous or methanolic solution in the presence of a catalyst under pressure and at elevated temperatures. Suitable catalysts are nickel and/or copper, preferably in combination with other metals such as manganese or chromium. It is of advantage to hydrogenate at relatively low temperatures, for instance in the range of about 70 to 120° C., in order to avoid side reactions.

From the hydrogenated product, the pentitols are distilled off under mild conditions, for instance by removing first the solvent and then subjecting the product to steam distillation in vacuo. The obtained pentitols, particularly xylitol, are useful as plasticizers or softeners in the paper and tobacco industry or for cellulose ester films; they may also be employed as polyol component in the manufacture of alkyd type resins. Xylitol is also useful as sweetening agent in the food industry.

The distillation residue consists of hexitols, the composition of which depends to a certain extent on the nature of the starting material. Syrups obtained in the saccharification of softwood produce, on hydrogenation, relatively large amounts of mannitol, which may be recovered in pure crystalline form on concentration of the hexitol solution. The remaining hexitol solution consists essentially of sorbitol, which, after purification and concentration to syrup consistency may be used as plasticizer and humidifier.

Polyol solutions of the kind here involved are mostly sold and used in the form of about 70% aqueous syrups. It is a serious drawback of the pentitol and hexitol solutions obtainable by separation of the hydrogenated saccharification syrups that said solutions are not stable under normal temperature conditions of storage and shipment, but become cloudy by precipitation of crystals. It is therefore one of the objects of this invention to obtain stable aqueous solutions containing 70% and more by weight of polyol. According to the invention, this object is accomplished by suitable blending of the separately recovered polyols.

For a better understanding of the conditions controlling the properties of the aqueous polyol solutions, drawings are attached hereto, in which:

Fig. 1 shows the solubility of xylitol in water as a function of the temperature, and the specific gravity of such aqueous solutions, and Fig. 2 shows the corresponding properties of aqueous mannitol solutions.

Fig. 1 shows that it is impossible to obtain the desired 70% polyol solutions from xylitol because at temperatures of 20° C. not more than about 65% thereof are soluble in water. In other words, if a warm 70% xylitol solution has been prepared, said solution will crystallize out xylitol, on cooling.

According to the invention, the total polyol content of xylitol solutions is increased by dissolving xylitol in, or by adding xylitol solutions to, concentrated sorbitol syrups under such conditions that the total polyol content is higher than 65 percent. If, for instance, 60 g. of crystallized xylitol, obtained from the xylitol fraction of the hydrogenated sugars, are dissolved in 100 g. of a 60% hexitol solution as obtained in working up the residue of the hydrogenated mixture after distillation of the xylitol, a stable solution is obtained which contains 120 g. of polyol in 160 g. of solution, which corresponds to a total polyol concentration of 75 percent.

Similar difficulties arise in the preparation of hexitol solutions. In the catalytic hydrogenation of the saccharification in liquors, glucose forms, by intermolecular rearrangement, a certain amount of mannose which is reduced to mannitol. In wood saccharification in liquors, the solutions contain from the starting materials a relatively high content of mannose which also forms mannitol. In view of the low solubility of mannitol (see Fig. 2), such mannitol-containing sorbitol solutions tend to precipitate mannitol crystals on cooling.

We have found that the mannitol precipitation in such syrups is prevented when the solutions are blended with the obtained pentitol solution of at least the same polyol concentration. In this way, stable polyol blends containing essentially sorbitol-mannitol and up to 25 percent of pentitol may be prepared. For the same reason, it is of advantage to hydrogenate highly viscous sugar syrups which have a high content of polymeric sugars.

The invention will be illustrated by the following examples, where parts are given by weight.

*Example 1*

1,000 kg. of pine wood comminuted to a grain size of about 1 mm. were subjected to a prehydrolysis with 35% HCl at a temperature of about 20° C., whereby 240 kg. of hemicelluloses were dissolved. Subsequently, the material was subjected at the same temperature to the main hydrolysis step, whereby about 300 kg. of cellulose were dissolved. Each of the hydrolysates was concentrated in vacuo to a thick syrup which contained about 3.5% of residual hydrochloric acid, calculated on the sugar. Each of said syrups was diluted to a sugar content of about 15 percent and heated in an autoclave for a period of three hours at 120° C. Subsequently, fuller's earth was added for clarification and precipitation of small amounts of colloidal substances. The solutions were filtered and then passed through a bed of a decolorizing resin. The thus obtained liquids passed through an anion exchange resin in order to remove all free acids, comprising essentially hydrochloric acid and small amounts of organic acids such as levulinic acid. Subsequently, the solutions passed through a cation exchange resin to remove all cations originated from the wood substance. The weakly acid solutions leaving the cation exchanger were passed through a second anion exchange filter and finally through a second decolorization filter. In this way, water-clear sugar solutions were obtained, which were completely free from acids and salts. Said solutions were concentrated to syrups of about 80 percent sugar content. The syrups had the following composition (based on the material in the dry state).

|  | Syrup from Pre-hydrolysis, Percent | Syrup from Main Hydrolysis, Percent |
| --- | --- | --- |
| Glucose | 25.6 | 82.5 |
| Polymeric sugars | 5.0 | 3.0 |
| Galactose | 5.3 | 1.1 |
| Mannose | 29.0 | 6.4 |
| Arabinose | 4.6 | 1.2 |
| Xylose | 30.5 | 5.8 |

After more than 80 percent of the glucose had been crystallized out from the main hydrolysis syrup, the mother liquor was combined with the prehydrolysis syrup to a solution of the following composition:

| | Percent |
| --- | --- |
| Glucose | 27 |
| Polymeric sugars | 7 |
| Galactose | 5 |
| Mannose | 22 |
| Arabinose | 4 |
| Xylose | 35 |

The neutral solution of said sugar mixture was adjusted to a total sugar content of about 40 percent and converted to polyhydric alcohols with hydrogen under a pressure of 300 atm. at a temperature which was allowed to rise slowly from about 70° C. to about 120° C. A catalyst consisting of 80% of $SiO_2$, 14% of Ni, 5% of Cu, .5% of Mn and .5% of Cr was used, and the reaction was continued until the absorption of hydrogen had essentially terminated.

The hydrogenated mixture, which may still contain a small residual sugar content of about 1 to 3 percent was separated from the catalyst and subjected to vacuum distillation whereby substantially the entire xylitol formed from xylose was distilled over. It was separated from the carrier steam by fractionated condensation, whereby it was obtained in excellent purity. The yield was 30 to 33 percent, calculated on the total initial sugar input.

The darkish distillation residue was diluted with water to about 30% and purified by percolation with a decolorizing resin. After concentration of the thus obtained clear solution to a solids content of about 75%, mannitol crystallized out on cooling after seeding and could be separated, for instance by filtration. The yield was about 18 to 20 percent, calculated on the total sugar input.

The mother liquor from the mannitol crystallization was percolated again over a decolorizing resin to remove the discoloring impurities, and then concentrated to a syrup consistency of about 75 to 80 percent of solids content. The dry substance of said syrup comprised about 75 percent of sorbitol in addition to other polyhydric alcohols. This syrup could be stored without precipitation of crystals for unlimited periods of time when about 25 percent, calculated on the weight of the syrup, of xylitol were added.

*Example 2*

1,000 kg. of beech wood were comminuted to an average grain size of about 1 mm. and hydrolyzed with 30% HCl at 20° C., whereby 220 kg. of hemicelluloses were dissolved (prehydrolysis). Subsequently, 430 kg. of cellulose were dissolved out by means of 40 to 41% HCl at the same temperature (main hydrolysis). The solutions were separately concentrated to syrups by vacuum distillation, and processed as described in Example 1. The final syrups had the following composition (based on the material in the dry state).

|  | Pre-hydrolysis Syrup, Percent | Main Hydrolysis Syrup, Percent |
| --- | --- | --- |
| Glucose | 4.9 | 87.3 |
| Polymeric sugars | 4.0 | 4.0 |
| Galactose | 1.0 | 0.5 |
| Mannose | 1.4 | 5.0 |
| Arabinose | 2.7 | |
| Xylose | 86.0 | 3.2 |

After more than 80 percent of the glucose had been crystallized out from the main hydrolysis syrup, the mother liquor and the prehydrolysis syrup were processed separately in the manner set forth in Example 1. The dry substance of the mother liquor had the following composition:

| | Percent |
| --- | --- |
| Glucose | 54.4 |
| Polymeric sugars | 14.4 |
| Galactose | 1.8 |
| Mannose | 18.0 |
| Arabinose | --- |
| Xylose | 11.4 |

*Example 3*

1000 kg. of finely comminuted pine wood was subjected to a prehydrolysis and hydrolysis treatment, as set forth in Example 1. There were dissolved 240 kg. of hemicellulose and 400 kg. of cellulose. Both the prehydrolysis and hydrolysis solution were concentrated under reduced pressure to thick syrups which contained still 3½ percent of hydrochloric acid, calculated on the sugar. For a better flocculation of the colloids, the syrups were diluted with water to a sugar content of 20 to 25 percent, and each syrup was heated for half an hour at 90 to 100° C. The further processing of the syrups took place as described in Example 1.

Two highly viscous sugar solutions were obtained, which had the following dry composition:

|  | Syrup from Pre-hydrolysis, Percent | Syrup from Main Hydrolysis, Percent |
| --- | --- | --- |
| Polymeric sugars | 48.8 | 49.5 |
| Glucose | 16.1 | 43.0 |
| Galactose | 1.0 | 0.5 |
| Mannose | 13.7 | 3.4 |
| Arabinose | 2.3 | 0.6 |
| Xylose | 18.1 | 3.0 |

To the syrup from the main hydrolysis, there was added 15 percent of xylose, which resulted in the following composition (based on the material in the dry state):

| | Percent |
| --- | --- |
| Polymeric sugars | 43 |
| Glusose | 37.4 |
| Galactose | 0.4 |
| Mannose | 3.0 |
| Arabinose | 0.5 |
| Xylose | 15.7 |

As no precipitation of glucose took place in either syrup, the syrups were separately converted by hydrogenation to mixed polyalcohols which did not crystallize.

Example 4

A syrup obtained from the prehydrolysis product of pine wood was processed and hydrogenated, as set forth in Example 1, to a mixture consisting (calculated on the dry content) of

|  | Percent |
|---|---|
| Sorbitol | 30.6 |
| Xylitol | 35.1 |
| Mannitol | 34.3 |

The mixture was distilled with steam at a pressure of 13 to 15 mm. Hg in the temperature range between 178 to 194° C. There was distilled with 37 parts of steam 1 part of xylitol, the main portion at 190° C. The entire amount of the xylitol (35.1 parts) was recovered in this manner.

The distillation residue of 30.6 parts of sorbitol and 34.3 parts of mannitol was taken up in 19 parts of water at 20° C., and 28.8 parts of mannitol were crystallized out under stirring from this solution.

The remaining solution was a 65% polyhydric alcohol solution containing 30.6 parts of sorbitol, 19 parts of water, and about 4 parts of mannitol. This solution became cloudy at lower temperatures by crystallization of mannitol.

If the previously recovered xylitol was added to said solution in the form of a 65% aqueous solution, which required the addition of 19 parts of water to 35.1 parts of xylitol, the combined 107.7 parts of polyhydric alcohol solution (sorbitol+manitol+xylitol) contained 4 parts of mannitol in 38 parts of water, corresponding to a 9.5% mannitol solution; theoretically, this amount would produce crystalline precipitation of mannitol only below −3° C. (see Fig. 2). However, actually, no formation of crystals took place, even at lower temperatures because of the high viscosity of the syrup.

If only half of the recovered xylitol was used in the form of a 65% solution (17.55 parts of xylitol+9.5 parts of water) as additive to the sorbitol-mannitol solution remaining after crystallization of the mannitol, the combined solution contained 4 parts of mannitol in 28.5 parts of water, corresponding to a 12.4% mannitol solution. In this case, the solution was stable and did not show crystallization of mannitol at temperatures above about 12° C.

Example 5

Into a clear solution of 60 parts of sorbitol in 40 parts of water, there were introduced 60 parts of sorbitol at a temperature of 20° C. Said xylitol was readily dissolved.

The thus obtained xylitol-sorbitol solution represented a solution of 120 parts of polyhydric alcohols in 160 parts of total solution, corresponding to a concentration of 75 percent of polyhydric alcohols. Such a mixture of sorbitol and xylitol in aqueous solution is stable over long periods of time and suitable for storage and shipment. Xylitol does not crystallize out, as shown by the solubility curve of Fig. 1.

We claim:

1. A method for producing pentitols and hexitols from wood, comprising hydrolyzing wood at temperature of about 15 to 30° C. first with about 29-37% hydrochloric acid and then with 39 to 42% hydrochloric acid, thereby obtaining substantially mixtures of pentoses in said first and mixtures of hexoses in said second hydrolysis step, recovering crystalline glucose from said mixtures of hexoses, hydrogenating the remaining hexose solution and said pentoses, separating xylitol from the hydrogenated product by steam distillation under reduced pressure, diluting the distillation residue in water, precipitating mannitol crystals in said solution, separating said crystallized mannitol from the solution, and concentrating said solution to a syrup consisting substantially of sorbitol.

2. A method of preparing non-crystallizing aqueous polyol syrups containing at least 65 percent by weight of polyols from solution of pentoses and the mother liquor of the glucose crystallization obtained in the saccharification of cellulosic materials, which method comprises hydrogenating said pentose solutions and mother liquor, distilling xylitol from the hydrogenated material, separating the distillation residue into mannitol and sorbitol, and blending said xylitol in an aqueous solution containing the same in a concentration of 10 to 65 percent by weight with said sorbitol to an aqueous polyol composition containing a total polyol content of more than 65 to 75 percent, said xylitol-sorbitol blend being stable and non-crystallizing at temperatures of 20° C.

3. A method of preparing non-crystallizing concentrated aqueous polyol syrups from solutions of pentoses and the mother liquor of the glucose crystallization obtained in the saccharification of cellulosic materials, which method comprises hydrogenating said pentose solutions and mother liquor, distilling xylitol from the hydrogenated material, dissolving the distillation residue in hot water, precipitating mannitol in said solution by cooling, separating the precipitated mannitol from said solution, which contains sorbitol and residual mannitol, and adding to said solution said xylitol in the form of a more than 50% aqueous solution, thereby increasing the solubility of said residual mannitol.

4. A non-crystallizing aqueous polyol syrup stable at a temperature of 20° C., containing by weight about 60 to 65 percent of xylitol, and about 5 to 20 percent of sorbitol.

5. A stable aqueous polyol syrup of a total polyol concentration of at least 70 percent by weight, said syrup being at storage temperature substantially saturated with xylitol and containing, in addition, sorbitol in an amount sufficient to bring up the total polyol concentration to at least 70 percent.

6. A method of reducing the crystallizing tendency of mannitol in aqueous sorbitol-mannitol syrups without decreasing the polyol content of the syrup, said method comprising blending the syrup with an aqueous xylitol solution containing at least about the same polyol concentration as said sorbitol-mannitol syrup.

7. An aqueous non-crystallizing mannitol-containing polyol syrup comprising a sorbitol solution substantially saturated with mannitol blended with a xylitol solution of at least the same polyol concentration as said sorbitol-mannitol solution, the amount of xylitol being about 5 to 25 percent of the total polyol content.

References Cited in the file of this patent

UNITED STATES PATENTS

| 2,311,235 | Kuderman | Feb. 16, 1943 |
| 2,752,270 | Specht | June 26, 1956 |
| 2,791,523 | Schoen | May 7, 1957 |

OTHER REFERENCES

"Atlas Sorbitol", copyright 1947, by Atlas Powder Company, Wilmington 99, Delaware, page 2.